Aug. 26, 1930.    J. R. OISHEI    1,774,496

FENDER MIRROR

Filed May 11, 1927

Inventor
John R. Oishei
by Barton A. Bean Jr.
Atty.

Patented Aug. 26, 1930

1,774,496

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

FENDER MIRROR

Application filed May 11, 1927. Serial No. 190,520.

This invention relates to a rear view mirror for automobiles or motor vehicles and especially to the fender type of rear view mirrors.

Heretofore considerable attention has been given the mounting of rear view mirrors within the car or within the passenger compartment of motor vehicles and very little consideration has been given the external mounting of such mirrors. Fender brackets heretofore devised have usually embodied an erect standard or shaft rising directly from the fender in the form of a simple cylindrical shaft with no artistic beauty such as might harmonize and merge into the artistic lines of the vehicle.

The mechanical functioning and operation of the modern automobile has reached such a high degree of efficiency that the motor vehicle manufacturer is now directing his attention to the details and trimmings of the machine for appealing to the æsthetic senses of the purchasing public. It is therefore highly desirable that automobile trimmings and accessories, especially those which are to constitute the standard equipment of cars, should likewise be of an appealing and attractive construction which will harmonize gracefully and æsthetically with the curving and flowing body lines of the vehicle.

It is therefore an object of the present invention to provide a fender mirror which will readily harmonize with and beautify the body lines of the motor car.

It is also an object of the invention to provide a mirror support which coincides and blends with the curvature of the fender on which it is mounted and thereby effect a unitary design in a combined fender and mirror support.

It is further the object of the invention to provide an overhanging or cantilever type of mirror support which will dispose the reflective surface of the mirror closer to the operator of the car and thereby enable him to obtain a clearer vision of the traffic conditions to the rear.

A still further object of the invention is to provide a fender mirror in which the reflective surface is shielded from the sun rays or rain, so that while the mirror is mounted in an exposed position the driver may still have a clear and unobstructed view through the mirror.

The invention is further found to reside in the structural features of the mirror support and the arrangements and combinations of parts hereinafter described in detail and set forth in the appended claims, reference being had to the accompanying drawings, wherein;

Figure 1:
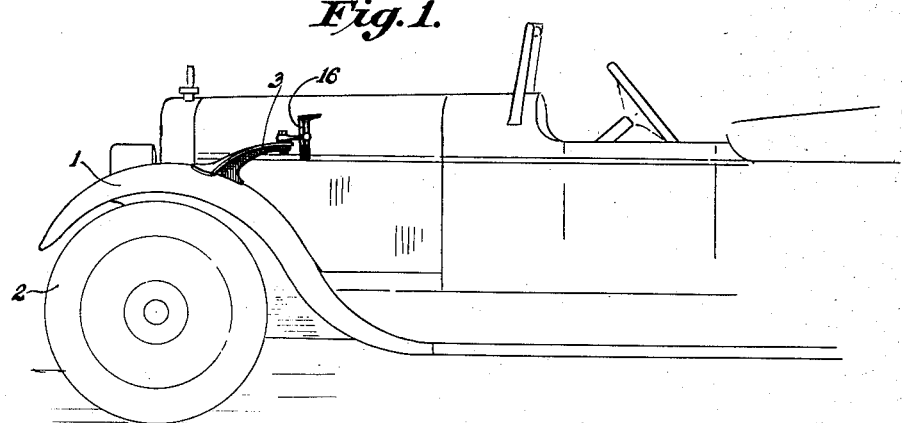
Fig. 1 is a side elevation of the improved fender mirror showing its application to a motor vehicle.
Figure 2:
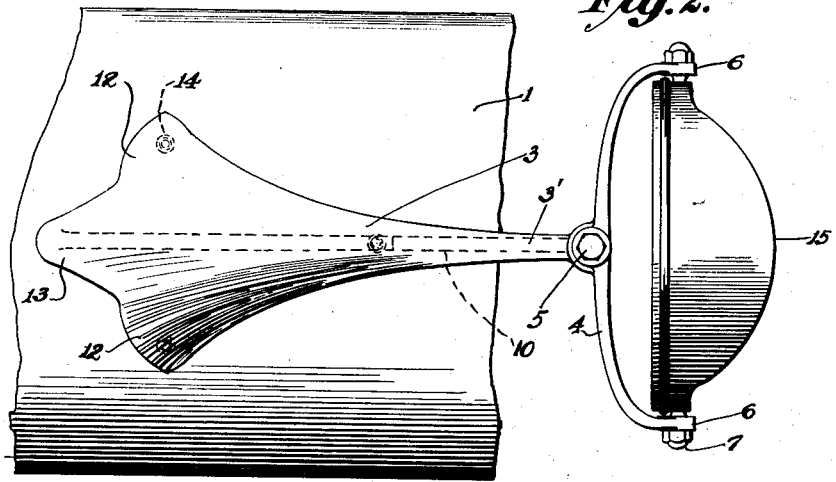
Fig. 2 is a top plan view of the fender mirror.
Figure 3:
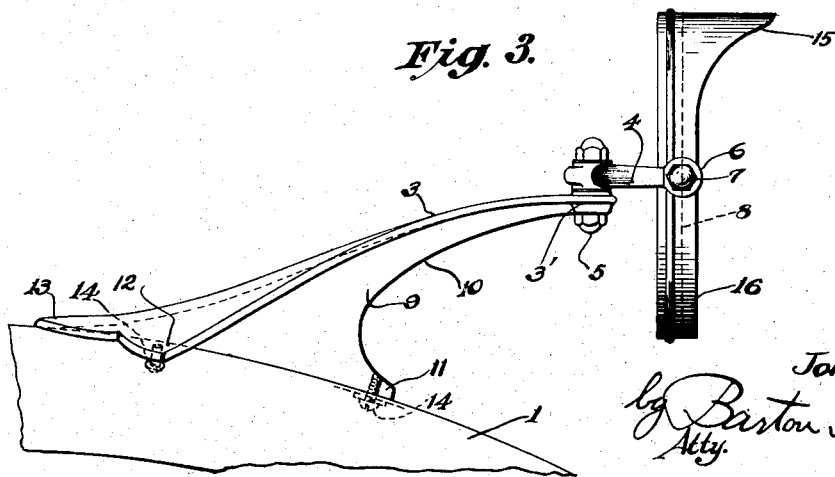
Fig. 3 is an enlarged side elevation of the fender mirror, the fender being shown in fragment in both Figures 2 and 3.

Proceeding in accordance with the present invention the numeral 1 designates the left front fender of a motor vehicle which extends forwardly and part way downwardly in front of the underlying left front wheel 2, thereby according to the immediate portion of the automobile body a graceful design wherein the fender follows the peripheral contour of the wheel which would be broken and interrupted by any erect standard rising abruptly from the fender. It is therefore very desirable to retain the original beauty of the motor car when any accessories are attached thereto, and to this end the improved mirror embodies a bracket of a cantilever design which may be so mounted upon the fender to the rear of the vertical plane of the wheel pivot as to dispose or support the mirror closer to the driver.

The cantilever bracket comprises a flange base from which rises the standard or arm 3 in a rearward direction, relative to the automobile, so as to overhang the base for a considerable distance toward the driver of the vehicle. On the free extremity 3' of the standard 3 is secured a mirror support which may be in the form of a bail or fork member 4, a vertical bolt or pivot pin 5 adjustably connecting the bail to the standard so that the bail member may be secured in an adjusted position about a vertical axis. The free ends of the bail member are turned into parallelism, as indicated at 6, and extending inwardly, in opposition to each other, from these parallel terminals 6 are pivot screws or trunnions 7 designed for pivotally and adjustably supporting the mirror 8 about a horizontal axis.

The standard 3 is provided on its underside with a reinforcing or supporting web 9, the lower edge 10 of which diverges from the free end 3 relative to the upper face of the standard and terminates at the base in a rear bend which forms a rearwardly extending toe 11. This broadening of the web obviously forms a wide base for the web, which base preferably is curved in conformity to the longitudinal curvature of the fender 1 so as to rest in contact therewith throughout. From the upper side of the web adjacent the base, extend lateral flanges 12 into contact with the fender, the extreme edges of which may be scalloped to form a third and central point of support, as indicated at 13. The base may therefore be said to comprise a vertical web 9 and oppositely extending webs 12, engaging the fender at the toe 11, and at the lateral flanges 12 and the line of contact between the web and the fender to the point 13 and thereby providing a substantial base formation for the attenuated and overhanging standard or arm 3 which latter extends or disposes the vertical pivot 5 considerably nearer the driver than the base of the bracket. Obviously, the flanges 12 lend lateral support to the bracket so as to secure the latter against undue vibration. The base is herein depicted as being transversely curved to conformably seat on the fender 1 which is also shown as having its upper surface transversely convex. Suitable fastening means, such as screws 14 are provided for securing the base to the fender.

The mirror 8 is provided about its upper edge with a visor 15 which overhangs the reflective surface of the mirror a sufficient distance to prevent the sun rays from obscuring a clear view of the reflected images in the mirror, as well as to prevent the accumulation of rain or snow upon said reflective surface. This visor may be formed integrally with the mirror frame 16, if desired, and by the provision of this visor it will be noted that the same carries forward the same general contilever or overhanging design of the entire fender mirror, said visor overhanging from the reflective surface in the same direction that the standard or arm 3 overhangs its base. It may here be noted that the mirror is equally adaptable for mounting on a spare tire carried by the vehicle running board, without departing from the spirit of the invention.

The scallop or point 13 gradually softens off the meeting or intersection of the slightly convexed upper side of the standard 3 with the convex surface of the fender so that the forward convexity of the latter is gracefully blended and carried up into the generally convexed standard which overhangs the underlying and downwardly curving surface of the rear portion of the fender, into which latter surface the return bend or curvature of the edge 10, forming the toe 11, is mergingly brought. This gives a general appearance of merger of both the forward and rearward portions of the fender into the bracket, the merging effect being drawn out into the attenuated and gracefully drooping and overhanging arm 3. The body lines of the car are thus carried out in the body lines of the mirror bracket, while accomplishing the desideratum of disposing the mirror closer to the driver, since the vertical pivot 5 is laterally removed rearwardly from over the base of the bracket but in superposed relation to the downwardly curving rear portion of the fender.

I claim:—

1. A rear view mirror bracket comprising a standard substantially T-shaped in cross section midway between its ends and consisting of a web having oppositely extending flange portions extending from the upper edge of said web, the lower edge of said web being formed with a return curvature to form a broadened base, and said flanges extending progressively greater distances from said web toward said base to form lateral support for said web on opposite sides thereof, said web and flanges attenuating toward the opposite end of the standard to form an overhanging support for a reflective surface.

2. A cantilever bracket for rear view mirrors comprising a vertical web having a broad base and an attenuated and overhanging standard part, and lateral supporting parts extending in opposite directions from the upper edge of the web and adjacent the base thereof for giving lateral reinforcement to the web, said lateral reinforcements being disposed rearwardly of the forward edge of the web base, said web base having a toe extending rearwardly beneath the overhanging standard part, and means for securing said toe and said lateral reinforcements to a support.

3. A rear view mirror for mounting on the fenders of automobiles, comprising a cantilever bracket having a relatively broad supporting base and a standard rising angularly therefrom and terminating in a perpendicular plane spaced laterally from the base, said standard attenuating upwardly and provided on its free end with a substantially vertical pivoting member, a bail member secured on said pivoting member, and a reflective body having oppositely extending trunnions pivoting in the opposite ends of said bail member, said reflective body having an encircling frame from which the trunnions oppositely extend, the upper portion of said frame being extended forwardly to create a visor for said body.

4. A cantilever bracket for rear view mirrors comprising a vertical web having a broad base and an attenuated and overhanging standard part, and lateral supporting parts extending in opposite directions from the upper edge of the web and adjacent the base thereof for giving lateral reinforcement to the web, said lateral reinforcements being disposed rearwardly of the forward edge of the web base, said overhanging standard part provided on its free end with a pivoting member, a mirror supporting member carried by said pivoting member and a mirror carried by said supporting member and adjustable therewith about the axis of said pivoting member.

JOHN R. OISHEI.